(12) United States Patent
Bozkurt

(10) Patent No.: US 8,979,447 B2
(45) Date of Patent: Mar. 17, 2015

(54) FACE MILLER AND USE THEREOF

(75) Inventor: Lutfi Bozkurt, Winterlingen (DE)

(73) Assignee: Guehring OHG, Albstadt (DE)

( * ) Notice: Subject to any disclaimer, the term of this patent is extended or adjusted under 35 U.S.C. 154(b) by 0 days.

(21) Appl. No.: 13/592,895

(22) Filed: Aug. 23, 2012

(65) Prior Publication Data

US 2013/0045059 A1     Feb. 21, 2013

Related U.S. Application Data

(63) Continuation of application No. PCT/EP2011/053312, filed on Mar. 4, 2011.

(30) Foreign Application Priority Data

Mar. 4, 2010 (DE) .......................... 10 2010 000 640

(51) Int. Cl.
   *B23C 5/20*       (2006.01)
   *B23C 5/06*       (2006.01)
   *B23C 5/18*       (2006.01)

(52) U.S. Cl.
   CPC ... *B23C 5/06* (2013.01); *B23C 5/18* (2013.01); *B23C 2200/203* (2013.01);
   (Continued)

(58) Field of Classification Search
   CPC ........................................................ B23C 5/20
   USPC ............. 407/34, 42, 11, 58, 61, 62, 118, 113; 409/132
   See application file for complete search history.

(56) References Cited

U.S. PATENT DOCUMENTS 3,597,817 A * 8/1971 Whalley .......................... 407/11
4,302,135 A * 11/1981 Lillie .............................. 408/59
(Continued)

FOREIGN PATENT DOCUMENTS

CH        686 235        2/1996
DE        10052963 A1 *  5/2002 ............... B23C 5/20
(Continued)

OTHER PUBLICATIONS

Drozda et al., Tool and Manufacturing Engineers Handbook, $4^{th}$ Ed., vol. 1, 10-31 to 10-34 (1983).*
(Continued)

*Primary Examiner* — Daniel Howell
*Assistant Examiner* — Ryan Rufo
(74) *Attorney, Agent, or Firm* — Burr & Brown, PLLC

(57) ABSTRACT

The face miller is equipped with a plurality of plate-shaped hard material cutting inserts that are distributed over the circumference. The hard material cutting inserts are located on a graduated circle in pockets of a blade carrier and have a main cutting edge, which is adjusted at a cutting edge angle smaller than 90° relative to the working plane of the miller. In order to ensure maximum machining performance at a good service life, the cutting edge angle is selected to range between 10° and 30°, wherein the main cutting edge at the same time has a slightly convex design. The main cutting edge transitions into the secondary cutting edge via a transition radius having a value that ranges between 0.5 and 1.5 mm. The axial rake angle ranges between 20 and 30°. According to an advantageous further development, the radial rake angle ranges between −6° and −10°.

13 Claims, 4 Drawing Sheets

(52) U.S. Cl.
CPC .......... *B23C 2210/0407* (2013.01); *B23C 2210/0435* (2013.01); *B23C 2210/045* (2013.01); *B23C 2210/084* (2013.01); *B23C 2210/206* (2013.01); *B23C 2210/282* (2013.01); *B23C 2222/04* (2013.01); *B23C 2224/04* (2013.01); *B23C 2224/22* (2013.01); *B23C 2224/24* (2013.01); *B23C 2224/36* (2013.01); *B23C 2226/125* (2013.01); *B23C 2226/315* (2013.01); *B23C 2228/10* (2013.01); *B23C 2240/08* (2013.01); *B23C 2240/21* (2013.01); *B23C 2250/12* (2013.01)
USPC .......... 409/132; 407/12; 407/113; 407/118

(56) References Cited

U.S. PATENT DOCUMENTS

| | | | | |
|---|---|---|---|---|
| 4,561,810 | A * | 12/1985 | Ohno | 407/118 |
| 4,743,144 | A * | 5/1988 | Shikata | 407/42 |
| 4,844,666 | A * | 7/1989 | Tsujimura et al. | 407/34 |
| 5,092,718 | A * | 3/1992 | Shallenberger | 408/188 |
| 5,871,850 | A * | 2/1999 | Moriguchi et al. | 428/651 |
| 5,951,212 | A * | 9/1999 | Emoto et al. | 407/34 |
| 6,196,771 | B1 | 3/2001 | Andersson | |
| 6,413,023 | B1 | 7/2002 | Nagashima | |
| 6,884,006 | B2 | 4/2005 | Nagashima | |
| 7,399,146 | B2 * | 7/2008 | Long et al. | 407/33 |
| 7,753,624 | B2 | 7/2010 | Günther et al. | |
| 2002/0090272 | A1 * | 7/2002 | Waggle | 407/114 |
| 2002/0131832 | A1 * | 9/2002 | Morsch | 407/118 |
| 2003/0002929 | A1 | 1/2003 | Nagashima | |
| 2004/0237723 | A1 * | 12/2004 | Kanada | 76/115 |
| 2005/0019109 | A1 * | 1/2005 | DeRoche et al. | 407/34 |
| 2006/0210364 | A1 * | 9/2006 | Bellmann et al. | 407/40 |
| 2007/0258777 | A1 | 11/2007 | Günther et al. | |
| 2010/0028092 | A1 | 2/2010 | Choi et al. | |
| 2011/0091294 | A1 | 4/2011 | Michelet et al. | |
| 2011/0123283 | A1 | 5/2011 | Michelet et al. | |

FOREIGN PATENT DOCUMENTS

| | | | | |
|---|---|---|---|---|
| DE | 10357811 A1 * | 7/2004 | | B23C 5/20 |
| DE | 699 30 449 | 11/2006 | | |
| EP | 1 260 298 | 11/2002 | | |
| JP | 59-69208 | 4/1884 | | |
| JP | 01-310808 A * | 12/1989 | | B23C 5/20 |
| JP | 2000-00714 * | 1/2000 | | B23C 5/00 |
| JP | 2004-202687 A * | 7/2004 | | B23C 5/20 |
| JP | 2006-181702 A * | 7/2006 | | B23C 5/20 |
| JP | 2006-263841 A * | 10/2006 | | B23C 5/20 |
| JP | 2007-301720 A * | 11/2007 | | B23C 5/20 |
| JP | 2010-069578 * | 4/2010 | | B23C 5/06 |
| WO | 98/16341 | 4/1998 | | |
| WO | 2005/089991 | 9/2005 | | |
| WO | 2008/099984 | 8/2008 | | |
| WO | 2009/157850 | 12/2009 | | |

OTHER PUBLICATIONS

JPO Translation JP 2004-202687 A.*

* cited by examiner

US 8,979,447 B2

FACE MILLER AND USE THEREOF

FIELD OF THE INVENTION

The invention relates to a face miller with a plurality of plate-shaped hard-material cutting inserts which are distributed over the circumference.

BACKGROUND OF THE INVENTION

Face millers of this type are frequently constructed as milling tools, in which cutting plates, for example indexable inserts made from hard metal, ceramic (cermet) or polycrystalline diamond (PCD), are accommodated in the tool carrier. Conventionally, in the case of surface milling tools the cutting plates are inserted in such a manner that a setting angle $K_r$ of approximately 75° results, that is to say the main cutting edges run at an angle $K_r$ of approximately 75° to the planar surface to be machined in a plane containing the miller axis. The miller axis is in this case perpendicular to the tool surface and the auxiliary cutters located at the front of the tool generate the surface to be prepared.

Like other milling tools, face millers of the type described at the beginning are also subject to a dynamic development towards greater cutting speeds with simultaneous increasing of tool life, wherein a very good surface quality of the machined surface should often be ensured even in the case of a very large milling performance. In this case, the clamping technology, using which a high-performance milling cutter of this type is coupled to the machine tool, is assigned further importance. Modern hollow shaft taper (HSK) interfaces make it possible to couple milling cutters with working diameters of well over 100 mm to the machine tool spindle in such a stable manner and with such large concentricity that high-quality machining surfaces can be achieved even at cutting speeds of more than 1000 m/min. The spindle speeds can be more than 10000 rpm in this case.

However, in the case of face millers of the type described at the beginning, the problem exists with ever increasing cutting speeds that the cutting edge which is abruptly dipped into the workpiece leads to a cutting force curve which can entail considerable vibrations of the miller and overloading of the cutting inserts at certain points. The milling performance and the service life of the tool can therefore often not be maintained at a satisfactory level.

SUMMARY OF THE INVENTION

The invention is therefore based on the object of developing a face miller, particularly a milling cutter according to the preamble of Claim 1 in such a manner that, in the case of high service life, improved milling performance with good achievable surface quality can be realised.

This object is achieved by means of a face miller with the features of Claim 1.

According to the invention, first, the setting angle $K_r$ is drastically reduced to a value between 10° and 30°, exceptionally preferably between 18° and 22°, wherein the main cutting edge is constructed in a slightly convex manner at the same time. It has been shown that in this manner, the cutting force can be distributed much better and consequently can be reduced considerably, wherein a so-called "neutral cut" results, that is to say no tensile and pressure loading results at the component to be machined. Due to the changed progression of the main cutting edge, a lower torque sensing at the spindle results at the same time, as a result of which a raising of the achievable cutting speeds of the miller to 4000 m/min is successful.

Due to the elongation of the cutting edge, the additional advantage results that the heat development at the cutters is relatively low, so that the tool according to the invention is exceptionally suitable for so-called dry machining (MQL) technology. Due to the shaping of the setting angle $K_r$ according to the invention to a range between 10° and 30°, the particular effect results that the majority region of the main cutter acts as a rough cutter, whilst the substantially smaller region located radially on the inside operates as a finishing cutter. In the region of the finishing cutter, the cutting volume is substantially smaller, with the consequence that the cutting forces arising there are reduced and the achievable surfaces are machined with a better quality.

In addition, it is ensured according to the invention that the main cutting edge merges into the auxiliary cutting edge via a small transition radius, which is preferably given a value in the range between 0.5 and 1.5 mm. Thus, the service life of the miller can be increased further, as the transition radius is thus in the centre of the finishing cutting section, as a result of which, the service life thereof can be raised considerably. The performance of the face miller can be increased further if the axial cutting angle is chosen in a strongly positive manner, preferably in the range between 20° and 30°, particularly preferably between 23° and 27°. With this design, the further reduction of the heat development is successful as the cutters are located very positively. At the same time, it is therefore ensured that chip removal lies outside of the cutting region.

Influence can be exerted onto chip formation and at the same time onto the surface quality of the machined workpiece surface with the simplest of measures by means of the choice of the transition radius between the main cutting edge and the auxiliary cutting edge. Depending on customer requirements and depending on use conditions, the hard-material cutting insert used is correspondingly equipped with an adapted transition radius, wherein an increasingly better surface quality can be achieved with increasing value of the transition radius.

Influence can also be effectively and simply exerted on the surface quality to be achieved by means of the setting angle $K_r$, wherein an improvement of the surface quality of the machined surface tends to result with decreasing setting angle $K_r$. By means of the interaction of transition radius and setting angle $K_r$, the tool can therefore be adapted according to the invention to the respectively present field of application, i.e. to the desired quality of the machined workpiece surface, optimally and in accordance with customer wishes without having to change the overall structure of the tool.

With the feature combination of Claim 1, a tool is therefore created which stands out on the one hand by means of an improved milling performance, so that it is possible to operate with feed speeds of up to 40 m/min and cutting speeds of up to 4000 m/min, particularly if aluminium or aluminium alloys are machined, and which can be optimally adapted to the respectively desired purpose by means of a simple variation of geometry parameters. It has been shown that the structure of the tool can also be retained if extremely small and extremely large cutting circle diameters are present. The tool according to the invention is suitable for cutting circle diameters in the range from 10 to 1400 mm.

Advantageous configurations are the subject of the subclaims.

It has been established that a particularly effective cutting force reduction with simultaneous reduction of the thermal loading of the main cutter results if the radius of curvature of the main cutting edge takes on a value which lies in the range between 80 and 120 mm, preferably between 90 and 110 mm. These radii of curvature furthermore have the advantage that they can be reproduced with conventional machines, so that identical conditions result for all hard-material cutting inserts, as a result of which an identical wear for all cutting inserts is ensured.

The cutting reaction forces acting on the tool can be reduced further if according to Claim 3, work is carried out with a negative radial cutting angle which lies in the range between −6° and −10°, preferably between −7° and −9°. The cut thus becomes even softer and more even, as a result of which the smooth running of the tool is further improved.

With respect to the hard-material cutting inserts, there is great freedom with respect to configuration and selection of the material. It has been shown however that for the machining of aluminium and alloys thereof in particular, hard-material cutting inserts with a cutting plate made from polycrystalline diamond or cubic boron nitride (CBN) are particularly suitable in order to achieve extremely high milling performances, that is to say feed values. Of course, the actual dimension of the delivery depends on the respectively present machine tool and the spindle. Fundamentally however, the structure of the face miller according to the invention is able to considerably increase the milling performance of the tool for all materials.

If a cutting plate made from hard material is used, this is preferably fastened on a cutter carrier plate, wherein the fastening takes place either by means of adhesive bonding, soldering or clamping. It has been shown that particularly good cutting conditions can be achieved if the cutter carrier plate has a thickness of only from 2.3 to 2.9 mm and the cutting plate made from hard material has a thickness in the range of 0.4 to 0.6 mm.

Fundamentally, the hard-material cutting insert can be releasably mounted, for example screwed or clamped, in the compartment of the miller body. The performance of the tool is increased however if the hard-material cutting insert sits in the compartment of the cutter carrier by means of soldering or adhesive bonding. This is because the flutes can be constructed to be larger in this manner, which is further beneficial to chip removal and thus milling performance.

It is however similarly possible to accommodate the hard-material cutting insert in a cutter cassette which is then preferably adjustably fastened on the miller body.

The service life of the milling tool can be improved by means of a suitable coating of the hard-material cutting insert, wherein the type of coating is preferably chosen as a function of the material to be machined. Advantageous configurations of the coating are the subject of Claim 10.

As already mentioned at the beginning, the milling tool according to the invention itself is suitable for so-called dry machining even at the highest milling performances. In this case, it is advantageous to develop the milling tool according to Claim 11. The MQL (minimal quantity lubrication) fluid emerging from the outlet openings of the preferably internal coolant channels, which fluid is formed for example for the most part from compressed air mixed with very fine oil droplets and is used on the one hand for the lubrication and the cooling of the engaged cutters and at the same time for the cooling and the removal of the chip created. In this manner, the performance of the tool can be increased further.

Further advantageous configurations are the subject of the remaining subclaims.

BRIEF DESCRIPTION OF THE DRAWINGS

In the following, exemplary embodiments of the invention are explained in more detail on the basis of schematic drawings. In the figures.

DETAILED DESCRIPTION OF THE INVENTION

Figure 1:
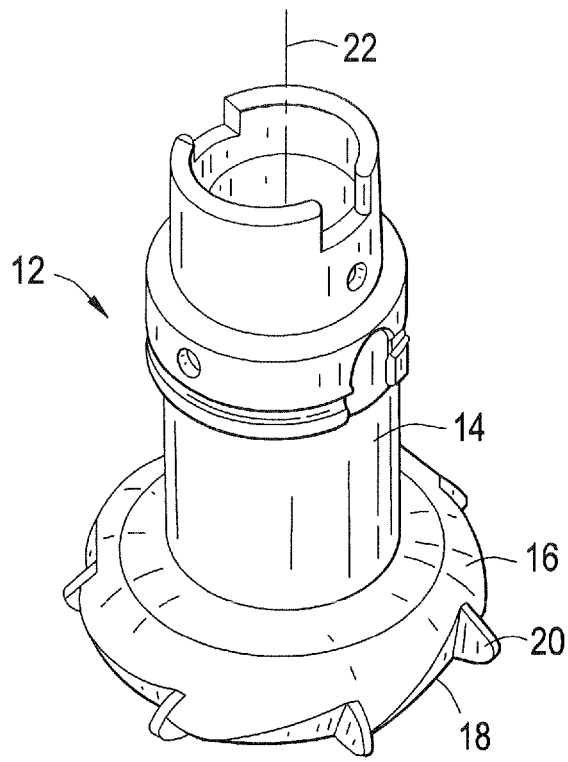
FIG. 1 shows a perspective view of a face miller in the embodiment as a milling cutter.

A face miller, the cylindrical shank 14 of which carries a milling cutter 16, is designated with the reference number 12 in FIG. 1. The milling cutter 16 accommodates one hard-material cutting insert 20 in each case in compartments 18, wherein the arrangement is achieved such that in this case, all hard-material cutting inserts 20 lie on the same reference circle or cutting circle and have a certain circumferential spacing with respect to one another. Advantageously, the circumferential spacings of adjacent hard-material cutting inserts 20 differ from one another, that is to say the division of the milling tool is unequal, as a result of which the achieved effect is that a tendency of the tool to vibrate caused by natural frequency is reduced.

The tool is a so-called surface milling cutter which is used for face surface milling. In tools of this type, the diameter of the milling cutter is preferably determined in such a manner that it corresponds to 1.3-times the width of the workpiece to be machined.

The distinctive feature of the tool according to FIG. 1 consists in the geometry and the position of the hard-material cutting inserts 20 being chosen in a particular manner relative to the axis of rotation 22 of the tool. This should be explained in more detail on the basis of the FIGS. 2 to 4.

Figure 3:
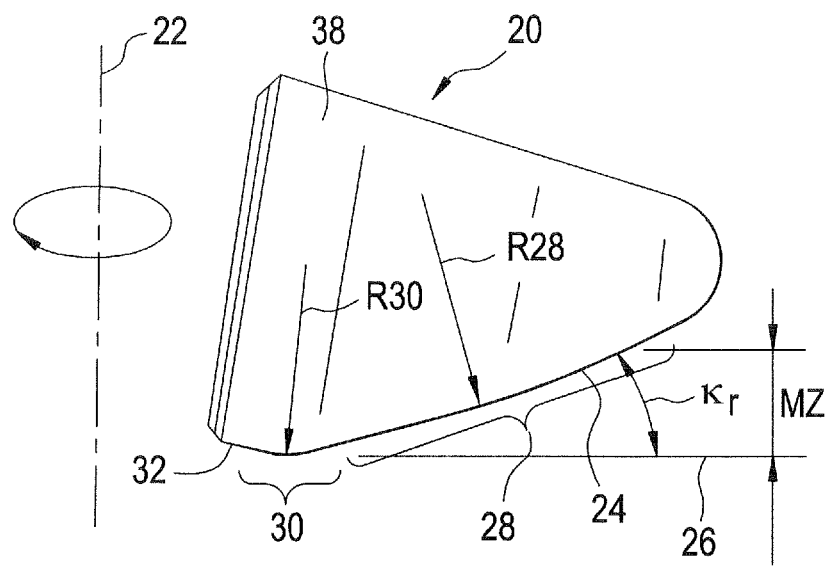
FIG. 3 shows a view of the hard-material cutting insert according to FIG. 2 with a viewing direction "III" in FIG. 2.

As emerges best from FIG. 3, the arrangement is achieved in such a manner that the main cutting edge 24 runs relative to a plane perpendicular to the miller axis 22, that is relative to the operating plane 26 of the milling tool, at a setting angle $K_r$, which lies in the range between 10° and 30°, preferably between 15° and 25°, most preferably between 18° and 22°. This particularly small setting angle $K_r$ leads to the main cutter 24 being in cutting engagement for a predetermined dimension MZ for delivery over a relatively long length $$LE \sim \frac{MZ}{\sin K_r}.$$

A relatively large section of the rough cutter 28 results in this manner, which a finishing cutting section 30 adjoins.

The distinctive feature of the arrangement exists not only with regards to the position in space, but rather also with regards to the cutting geometry. As can be seen best from FIG. 3, the main cutting edge is constructed in a slightly convex manner. In the actual case, at least over the greatest region of extent, the contour of the main cutting edge 24 follows a circular arc with a radius of curvature R28 which lies in the range between 80 and 120 mm, preferably between 90 and 110 mm, that is to say for example is 100 mm. The main cutting edge 24 merges into the auxiliary cutter 32 via a small transition radius R30 which lies in the range between 0.5 and 1.5 mm, that is say for example is 1 mm.

Chip formation and at the same time the surface quality of the machined workpiece surface are influenced by means of the transition radius R30 between the main cutting edge 24 and the auxiliary cutting edge 32. Depending on customer requirements and depending on use conditions, the hard-material cutting insert used is correspondingly equipped with an adapted transition radius, wherein an increasingly better surface quality can be achieved with increasing value of the transition radius.

Influence can also be effectively and simply exerted on the surface quality to be achieved by means of the setting angle $K_r$, wherein an improvement of the surface quality of the machined surface tends to result with decreasing setting angle $K_r$ and thus with a reduction of the dimension MZ (see FIG. 3). By means of the interaction of transition radius and setting angle $K_r$, the tool can therefore be adapted according to the invention to the respectively present field of application, i.e. to the desired quality of the machined workpiece surface, optimally and in accordance with customer wishes without having to change the overall structure of the tool.

The hard-material cutting insert of the first embodiment shown is a design in which a cutter carrier plate 34 carries a hard-material cutting plate 36 over the entire surface. The hard-material cutting plate 36 consists for example of polycrystalline diamond (PCD) or cubic boron nitride (CBN). It is also possible however to use other hard materials such as VHM or cermet materials. Hard-material cutting plates of this type preferably have a thickness of 0.5 mm.

The cutter carrier plate 34 consists of a material which is chosen in such a manner that it imparts a satisfactorily high degree of dimensional stability to the hard-material cutting insert 20. Preferably, the cutter carrier plate 34 consists of solid carbide or a cermet or ceramic material. It can however also consist of other material, even of aluminium or also of carbon-fibre reinforced plastic or glass-fibre reinforced plastic. It is important that the cutter carrier plate 34 is supported to the greatest extent possible over its entire surface on a support surface of the compartment 18 of the milling cutter 16, so that the cutting reaction forces can be captured reliably and without material overloading.

Figure 2:
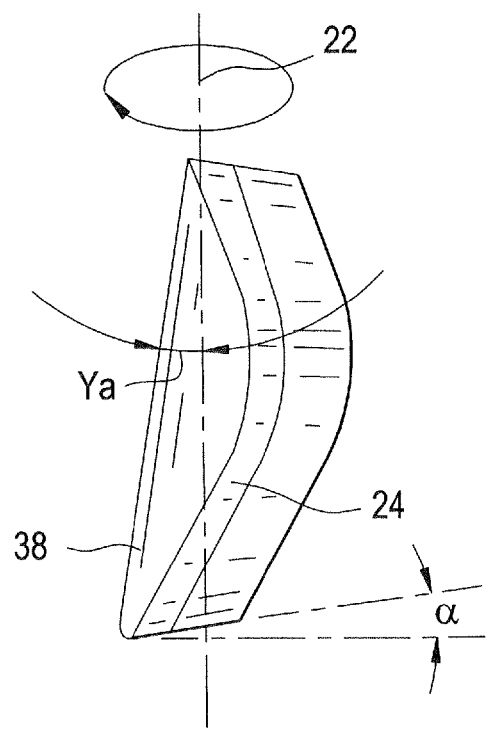
FIG. 2 shows the view onto a hard-material cutting insert in the viewing direction perpendicular to the axis of rotation of the face miller in a greatly enlarged schematic view.
Figure 4:
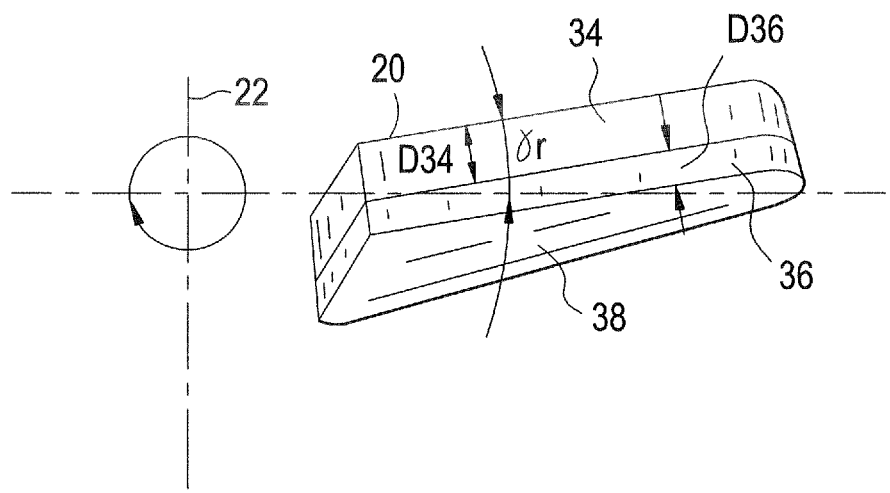
FIG. 4 shows a view of the hard-material cutting insert according FIG. 2 and FIG. 3 in a viewing direction parallel to the miller axis.

The position of the hard-material cutting insert 20 in space can be seen from the FIGS. 2 and 4. One can see from the illustration according to FIG. 2 that the hard-material cutting insert 20 is arranged in such a manner that the milling face designated with 38 is arranged in such a manner that an axial cutting angle $\gamma_a$ in the range between 20 and 30°, preferably between 23 and 27° results in the region of the main cutter 24.

A clearance angle is designated with the reference symbol α, which should be positive for the main and auxiliary cutters and for example is in the region of 8°.

With this geometry and configuration of the hard-material cutting insert, markedly improved cutting conditions result in the case of the high-speed milling of various materials, particularly however in the case of the milling of aluminium or aluminium alloys. Due to the relatively high axial cutting angle $\gamma_a$ in combination with the convex main cutter 24 which encloses a very small setting angle $K_r$ with the operating plane 26, very good cutting conditions with a very low heat development with good chip removal, which lies outside of the cutting region, result even in the case of very great milling performance.

The main cutter 24 elongated in the radial direction in this case operates as rough cutter, whilst the adjoining radially inner cutting section 30 operates as finishing cutter. Due to the improved cutting conditions with greatly homogenised cutting force, such large force peaks as are the case in conventional milling tools of comparable design no longer develop at the cutting inserts when entering into the material to be machined. The tool therefore operates more quietly even at increased milling performance and the surface to be produced can be produced with a better quality.

The previously described effect is improved yet further if the hard-material cutting insert 20—as illustrated in FIG. 4—is positioned in such a manner relative to a plane containing the axis of rotation 22 that a negative radial cutting angle $\gamma_r$ results. This radial cutting angle for example lies in the range between −6° and −10°, preferably between −7° and −9°. With this shaping, the cut to be performed by the miller cutter becomes even weaker. In other words, a so-called "neutral cut", in which tensile/pressure loads on the component to be machined are excluded, consequently results. At the same time, a further reduced torque sensing results at the spindle and due to a further elongation of the main cutter 24, a yet lower heat development results.

It has been shown that with a face miller which is equipped with hard-material cutting inserts of the geometry and positional arrangement according to FIGS. 2 to 4, cutting speeds of up to 4000 m/min can be realised, wherein the spindle rotational speed can lie in ranges above 10000 rpm. The feed can in this case be run in the range of 40 m/min, particularly if aluminium and aluminium alloys are machined for example.

This previously described configuration and arrangement of the hard-material cutting inserts on the face miller can be used particularly effectively if the milling cutter is combined with a satisfactorily stable shank 14. This shank 14 is preferably coupled via an HSK interface to the machine spindle or to a further system module, as a result of which it succeeds in ensuring satisfactorily high concentricities and vibrational stability even at the highest rotational speeds in the previously specified range.

On the basis of FIGS. 1 to 4, an embodiment of the face miller has been described, in the case of which only the core elements of the design are emphasised. In the following, a tested further embodiment of the face miller is explained on the basis of FIGS. 5 to 10 with true-to-scale reproduction of the details. In order to avoid repetitions, in the description of this embodiment, similar reference numbers are used for those components which correspond to the components of the above-described embodiments, the reference number being prefixed with "1" however, The face miller designated with 112 has a shank 114 with a HSK interface 140. The milling cutter designated with 116 is produced from steel like the shank 114. An inner channel arrangement for supplying the miller cutters with coolant/lubricant is indicated with dashed lines 142.

Preferably, this inner channel arrangement is realised in such a manner that a special lubricant/coolant channel is assigned to each cutter. Preferably, the outlet openings of the inner coolant channels 142, which are not illustrated in any more detail, are therefore located in the respective compartments 118, so that the coolant/lubricant emerging from the outlet openings can be used particularly effectively for heat dissipation and/or for removing the chips. The coolant/lubricant can be liquid lubricant, but also a so-called MQL fluid which is used in dry machining or minimum quantity lubrication (MQL technology). Such an MQL fluid is for example compressed air at a pressure of up to 50 bar, which is mixed with very fine oil droplets.

Figure 6:
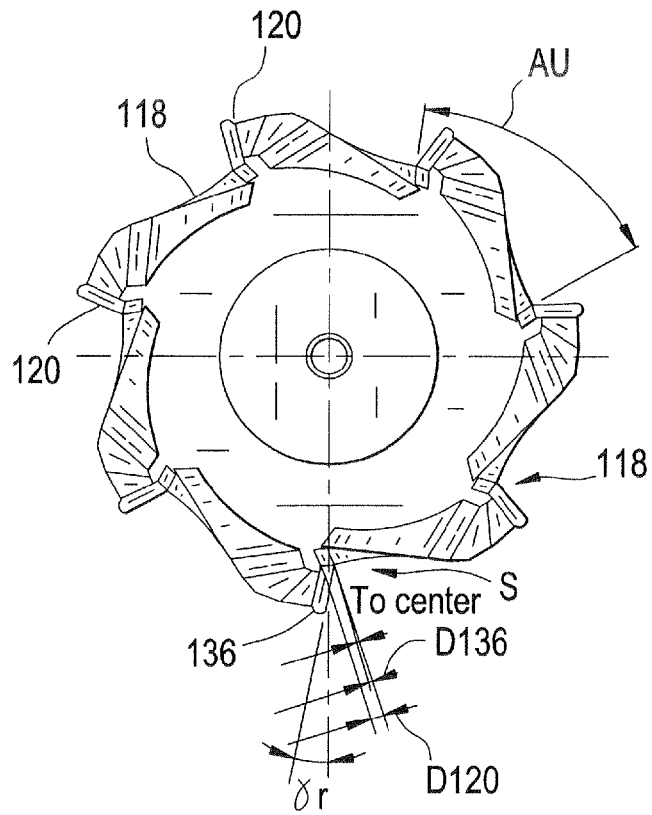
FIG. 6 shows the frontal view of the face miller according to FIG. 5.
Figure 7:
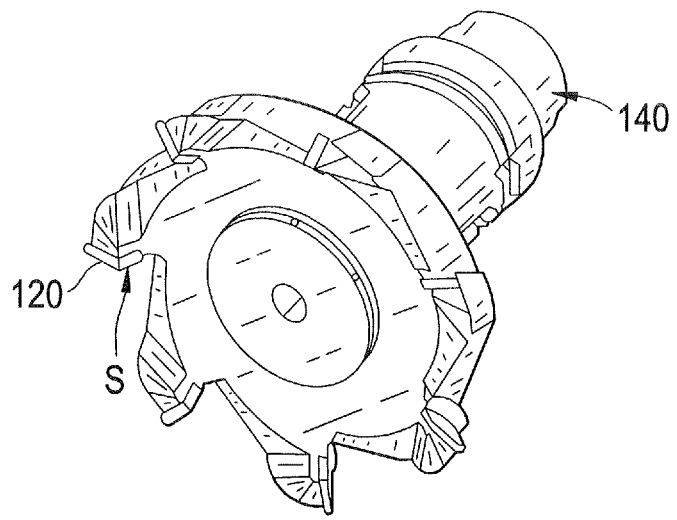
FIG. 7 shows a perspective view of the face miller according to FIG. 5 and FIG. 6.

As best results from FIG. 6 and FIG. 7, the milling cutter 116 is equipped with seven hard-material cutting inserts 120 which have the same circumferential spacing AU of 51.43° with respect to one another. The hard-material cutting inserts can be structured as was described with reference to the FIGS. 1 to 4. The compartments 118 are constructed in such a manner that a straight grooving of the milling cutter 116 results. The axial extent of a compartment 118 is designated with H 118. It is preferably approximately 25 to 30 mm in the case of a milling cutter with a diameter of approximately 130 mm.

The hard-material cutting inserts 120 are preferably supported over the entire surface on a support surface, which is not described in any more detail, of the compartment 118 in the milling cutter 116 assigned to the relevant cutting insert. The thickness D120 of the hard-material cutting insert 120 is for example 3 mm, whilst the hard-material coating, which for example can consist of PCD or CBN, has a thickness of 0.5 mm. This thickness is designated with D136.

The cutter transition between the main cutting edge 124 and the auxiliary cutter 132 is designated with the reference symbol S (see FIG. 8), wherein a small transition radius R130 in the range between 0.5 and 1.5 mm is again formed in this section. The finishing cutter is located in the region of this transition radius R130, whilst the finishing cutter is formed by the main cutting edge 124. There, the main cutting edge follows a radius of curvature R128, which again takes on values in the range between 80 and 120 mm, preferably between 90 and 110 mm.

Figure 10:
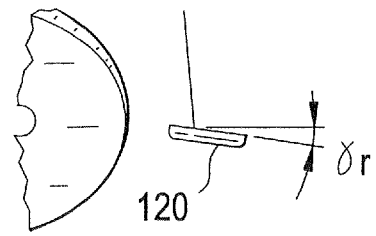
FIG. 10 shows a schematic illustration for clarifying the position of the hard-material cutting insert with respect to the miller axis to achieve a negative radial cutting angle.

Once again, the arrangement is realised in such a manner that in the case of a supporting of the hard-material cutting inserts 120 over the entire surface on corresponding support surfaces of the compartments constructed in the milling cutter 116, a negative radial milling angle $\gamma_r$ (see FIG. 6 and FIG. 10) of approximately 8° at the main cutter results. The illustration according to FIG. 10 shows the view in the viewing direction parallel to the orientation of the milling face 138 which therefore appears in FIG. 10 as a line. In this view, the angle $\gamma_r$ is 8° in the embodiment shown.

Figure 9:
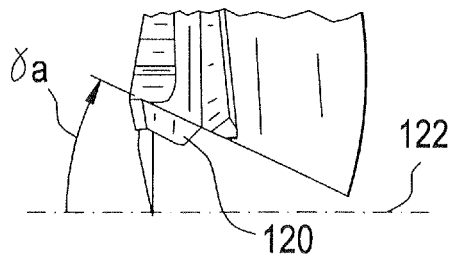
FIG. 9 shows the detail "IX" according to FIG. 5 in an enlarged illustration.

As emerges from the detail according to FIG. 9, the support surface for the hard-material cutting insert 120 constructed in the compartment 118 is positioned in such a manner that the milling face 138 is inclined by an angle of approximately 25° relative to the axis 122 of the miller.

The hard-material cutting insert 120 is therefore arranged in such a manner that a relatively large axial milling angle $\gamma_a$ in the range of approximately 25° and a radial milling angle $\gamma_r$ of around 8° result.

Figure 5:
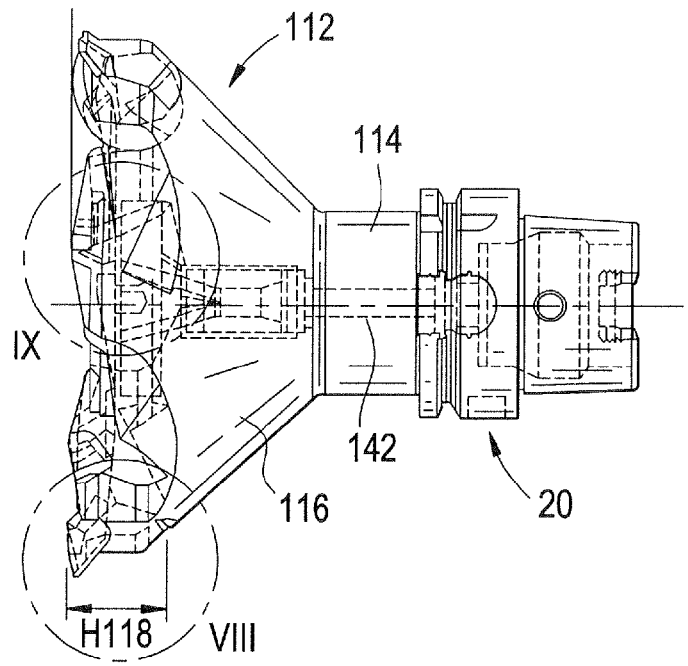
FIG. 5 shows a side view of a further embodiment of the face miller.
Figure 8:
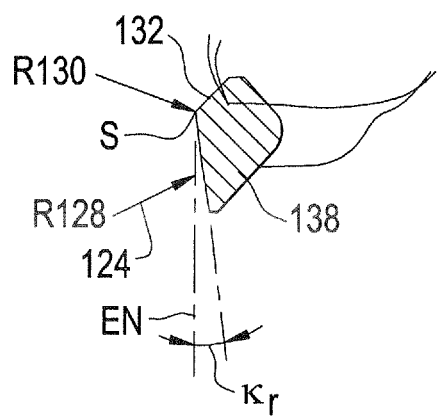
FIG. 8 shows the detail "VIII" in FIG. 5 in an enlarged illustration.

As also emerges from the illustration according to FIGS. 5 and 8, the main cutter 124 is positioned at an angle $K_r$ relative to a plane EN extending perpendicularly on the axis 122 of the milling tool, i.e. relative to the operating plane, which angle is in turn very small and lies in the range between 10° and 30°. The following configuration results with this configuration:

The main cutters run ahead of the cut with the apex S between main cutter 124 and auxiliary cutter 132. Due to the inclination of the main cutter 124 with respect to the operating plane EN at the small angle $K_r$ connected with the axial positioning of the hard-material cutting insert at the relatively large axial milling angle $\gamma_a$, in combination with the convex configuration of the main cutter 124 in connection with the formation of a negative radial milling angle $\gamma_r$, particularly low cutting forces and at the same time cutting conditions, which themselves lead to thermal loadings of the cutter which can be overcome even at large cutting speeds of up to 4000 m/min, result. Due to the open shaping of the compartments 118 in connection with suitable position and orientation of the outlet openings for the inner coolant/lubricant channels, the thermal loading of the cutters can be reduced further, as a result of which the cutting speeds and the milling performance of the tool can be increased further.

A tool which is built and shaped in accordance with the preceding description can have a wide range of tool diameters without changing the fundamental structure. Tools with cutting circle diameters, i.e. diameters on which the main cutter lies, in the range between 10 and 1400 mm have been produced and successfully used for the machining of surfaces of very different surface quality.

Of course, deviations from the exemplary embodiments shown are possible without abandoning the basic ideas of the invention. Thus, for example, it is possible to work with other hard materials, such as for example solid carbide or cermet materials, and the same is true for the choice of the material for the cutter carrier plate.

The cutter carrier plate can be selected from the group of steel, hard-metal, aluminium, carbon-fibre-reinforced and glass-fibre-reinforced materials. The thickness is also not limited to a dimension around 2.5 mm. It may vary and be selected as a function of the thickness of the hard-material cutting plate.

The hard-material cutting plate also does not necessarily have to cover the entire cutter carrier plate. It is similarly possible to work with a cutting plate insert which only extends in the region of the main and/or the auxiliary cutter. Also, the geometry of the hard-material cutting plate can be modified, for example shaped in such a manner that a chip breaker function can be fulfilled.

It is similarly possible to provide the hard-material cutting inserts with a wear-reducing coating, at least in certain sections. This coating can for example be formed from a hard-material coating based on TiN, TiAlN, AlTiN, AlCrN and/or $Al_2O_3$. This coating can be constructed as a single, as a composite or as a multi-layered layer. It is also possible to work with a hard amorphous carbon layer, that is to say a so-called DLC layer according to VDI guidelines VDI3824 Parts 1-4 and VDI-guideline 2840:2004. It is similarly possible to provide a soft protective layer, wherein this can be formed by a soft WC/C or an $MoS_2$ layer.

Instead of the direct integration of the hard-material cutting inserts into compartments of the milling cutter, the same may also be mounted in cassettes which for their part are then mounted on the milling cutter, for example fixedly or adjustably.

The main field of application of the milling tool according to the invention is the rough and finishing machining of aluminium or aluminium alloys, wherein cutting speeds of up to 4000 m/min can be realised.

In the exemplary embodiments shown, the arrangement is achieved in such a manner that the hard-material cutting inserts 20 or 120 are distributed with the same separation over the circumference. It is similarly possible to carry out an uneven division, that is so say to shape the mutual circumferential spacing AU of adjacent hard-material cutting inserts differently, in order to further suppress natural frequencies of the tool.

The invention therefore creates a face miller with a plurality of plate-shaped hard-material cutting inserts distributed over the circumference. The hard-material cutting inserts are located on a reference circle in compartments of a cutter carrier and have a main cutting edge which is positioned at a setting angle, which is smaller than 90° relative to the operating plane of the miller. To ensure the best machining outputs with good service life, the setting angle $K_r$ is constructed in a slightly convex manner in the range between 10° and 30°, preferably between 15° and 25°, wherein the main cutting edge is constructed in a slightly convex manner at the same time. According to an advantageous development, the axial milling angle $y_a$ lies in the range between 20 and 30° and the radial milling angle $y_r$ lies in the range between −6° and −10°, preferably between −7° and −9°.

The invention claimed is:

1. A face miller comprising:
    a plurality of plate-shaped hard-material cutting inserts which are distributed over a circumference of the face miller, and which are accommodated on a reference circle lying in compartments of a cutter carrier, each cutting insert having a main cutting edge and a corresponding auxiliary cutting edge,
    each main cutting edge positioned at a setting angle $K_r$, which is smaller than 90° relative to an operating plane of the miller,
    the setting angle $K_r$ lying in the range between 10° and 30°,
    each main cutting edge constructed in a slightly convex manner,
    each main cutting edge merging into each corresponding auxiliary cutting edge via a small transition radius with a value in the range between 0.5 and 1.5 mm, and
    each main cutting edge having an axial milling angle $\gamma_a$ lying in the range between 20 and 30°, and
    each main cutting edge being longer than the corresponding auxiliary cutting edge.

2. The face miller according to claim 1, wherein the main cutting edge essentially follows a radius, which lies in the range between 80 and 120 mm.

3. The face miller according to claim 1, wherein each main cutting edge comprises a radial milling angle $\gamma_r$, each radial milling angle $\gamma_r$ lying in the range between −6 and −10°

4. The face miller according to claim 1, wherein each cutting insert comprises a clearance angle $\alpha$, each clearance angle $\alpha$ lying in the range between 8 and 12°.

5. The face miller according to claim 1, wherein each hard-material cutting insert has a cutting plate made from polycrystalline diamond or cubic boron nitride encompassing the main cutting edge at least, wherein a thickness of the cutting plate lies in the range from 0.4 to 0.6 mm.

6. The face miller according to claim 5, wherein each cutting plate is fastened on a cutter carrier plate, the material of which is selected from among steel, hard-metal, aluminium, carbon-fibre-reinforced, and glass-fibre-reinforced materials.

7. The face miller according to claim 6, wherein each cutting plate is adhesively bonded or soldered to a respective one of the cutter carrierplates.

8. The face miller according to claim 1, wherein each hard-material cutting insert is soldered, clamped, or adhesively bonded to a respective one of the compartments of the cutter carrier.

9. The face miller according to claim 1, wherein the hard-material cutting inserts are arranged with irregular circumferential spacing with respect to one another.

10. The face miller according to claim 1, wherein each hard-material cutting insert is provided with a wear-reducing coating at least in certain sections.

11. The face miller according to claim 1, wherein the face miller comprises internal coolant channels which have outlet openings directed onto the main cutting edges.

12. A method comprising contacting a face miller according to claim 1 with an aluminium material.

13. A method comprising operating a face miller according to claim 1 at a cutting speed of up to 4000 m/min.

* * * * *

UNITED STATES PATENT AND TRADEMARK OFFICE
CERTIFICATE OF CORRECTION

| | |
|---|---|
| PATENT NO. | : 8,979,447 B2 |
| APPLICATION NO. | : 13/592895 |
| DATED | : March 17, 2015 |
| INVENTOR(S) | : Bozkurt |

It is certified that error appears in the above-identified patent and that said Letters Patent is hereby corrected as shown below:

In the Claims

Claim 3, Col. 10, Line 3

Please change "milling angle $\gamma_r$ lying in the range between -6 and -10°" to -- milling angle $\gamma_r$ lying in the range between -6 and -10°. --

Signed and Sealed this
First Day of September, 2015

Michelle K. Lee
*Director of the United States Patent and Trademark Office*